(12) United States Patent
Poteet et al.

(10) Patent No.: US 11,634,213 B2
(45) Date of Patent: Apr. 25, 2023

(54) HIGH TEMPERATURE OXIDATION PROTECTION FOR COMPOSITES

(71) Applicant: GOODRICH CORPORATION, Charlotte, NC (US)

(72) Inventors: Steven A. Poteet, Hamden, CT (US); Gavin Charles Richards, Poughkeepsie, NY (US); Zachary Cohen, West Hartford, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 879 days.

(21) Appl. No.: 16/190,817

(22) Filed: Nov. 14, 2018

(65) Prior Publication Data

US 2020/0148340 A1 May 14, 2020

(51) Int. Cl.
*C04B 41/52* (2006.01)
*C04B 41/45* (2006.01)
*C04B 41/50* (2006.01)
*B64C 25/42* (2006.01)
*F16D 65/12* (2006.01)
*B05D 3/02* (2006.01)
(Continued)

(52) U.S. Cl.
CPC ............ *B64C 25/42* (2013.01); *B05D 3/0254* (2013.01); *B05D 7/546* (2013.01); *B32B 9/005* (2013.01); *B32B 18/00* (2013.01); *C04B 41/4543* (2013.01); *C04B 41/5035* (2013.01); *C04B 41/5057* (2013.01); *C04B 41/5062* (2013.01); *C04B 41/52* (2013.01); *F16D 65/12* (2013.01)

(58) Field of Classification Search
CPC .............. C04B 41/4543; C04B 41/522; C04B 41/5059; C04B 41/5024; C04B 41/5035; C04B 41/009; C04B 41/87; C04B 41/5057; C04B 41/5058; C04B 41/89; C04B 41/5048; C04B 41/86; C04B 2111/0062; C04B 2111/00982; C04B 41/52; C04B 41/5062; B64C 25/42; F16D 2200/0047; F16D 65/127; F16D 69/23
See application file for complete search history.

(56) References Cited

U.S. PATENT DOCUMENTS 2,685,539 A    8/1954   Woodburn, Jr. et al.
2,685,540 A    8/1954   Woodburn, Jr. et al.
(Continued)

FOREIGN PATENT DOCUMENTS

CN    1046517      10/1990
CN    101328077    12/2008
(Continued)

OTHER PUBLICATIONS

U.S. Appl. No. 17/571,083. Oxidation Protection With Improved Water Resistance for Composites. filed Jan. 7, 2022. (Year: 2022).*
(Continued)

*Primary Examiner* — William P Fletcher, III
(74) *Attorney, Agent, or Firm* — Snell & Wilmer L.L.P.

(57) ABSTRACT

An oxidation protection system disposed on a substrate is provided, which may comprise a boron layer comprising a boron compound disposed on the substrate; a silicon layer comprising a silicon compound disposed on the boron layer; and at least one sealing layer comprising monoaluminum phosphate and phosphoric acid disposed on the silicon layer.

7 Claims, 6 Drawing Sheets

(51) Int. Cl.
   B05D 7/00 (2006.01)
   B32B 9/00 (2006.01)
   B32B 18/00 (2006.01)

(56) References Cited

U.S. PATENT DOCUMENTS

| | | | |
|---|---|---|---|
| 2,685,541 A | 8/1954 | Woodburn, Jr. et al. |
| 2,685,542 A | 8/1954 | Woodburn, Jr. et al. |
| 2,989,153 A | 6/1961 | Boulet et al. |
| 3,342,627 A | 9/1967 | Paxton et al. |
| 3,510,347 A | 5/1970 | Strater |
| 3,692,150 A | 9/1972 | Ruppe, Jr. |
| 3,713,882 A | 1/1973 | DeBrunner et al. |
| 3,794,509 A | 2/1974 | Trauger et al. |
| 3,972,395 A | 8/1976 | Jannasch et al. |
| 4,290,510 A | 9/1981 | Warren |
| 4,330,572 A | 5/1982 | Frosch et al. |
| 4,332,856 A | 6/1982 | Hsu |
| 4,425,407 A | 1/1984 | Galasso et al. |
| 4,439,491 A | 3/1984 | Wilson |
| 4,454,193 A | 6/1984 | Block |
| 4,471,023 A | 9/1984 | Shuford |
| 4,500,602 A | 2/1985 | Patten et al. |
| 4,548,957 A | 10/1985 | Hucke |
| 4,567,103 A | 1/1986 | Sara |
| 4,617,232 A | 10/1986 | Chandler et al. |
| 4,621,017 A | 11/1986 | Chandler et al. |
| 4,663,060 A | 5/1987 | Holinski |
| 4,702,960 A | 10/1987 | Ogman |
| 4,711,666 A | 12/1987 | Chapman et al. |
| 4,726,995 A | 2/1988 | Chiu |
| 4,760,900 A | 8/1988 | Shima et al. |
| 4,837,073 A | 6/1989 | McAllister et al. |
| 4,863,001 A | 9/1989 | Edmisten |
| 4,892,790 A | 1/1990 | Gray |
| 4,958,998 A | 9/1990 | Yamauchi et al. |
| 5,073,454 A | 12/1991 | Graham |
| 5,077,130 A | 12/1991 | Okuyama et al. |
| 5,094,901 A | 3/1992 | Gray |
| 5,102,698 A | 4/1992 | Cavalier et al. |
| 5,153,070 A | 10/1992 | Andrus et al. |
| 5,198,152 A | 3/1993 | Liimatta et al. |
| 5,215,563 A | 6/1993 | LaCourse et al. |
| 5,224,572 A | 7/1993 | Smolen et al. |
| 5,242,746 A | 9/1993 | Bommier et al. |
| 5,256,448 A | 10/1993 | De Castro |
| 5,273,819 A | 12/1993 | Jex |
| 5,298,311 A | 3/1994 | Bentson et al. |
| 5,324,541 A | 6/1994 | Shuford |
| 5,352,494 A | 10/1994 | Rousseau |
| 5,360,638 A | 11/1994 | Lequertier |
| 5,401,440 A | 3/1995 | Stover et al. |
| 5,427,823 A | 6/1995 | Varshney et al. |
| 5,439,080 A | 8/1995 | Haneda et al. |
| 5,480,676 A | 1/1996 | Sonuparlak et al. |
| 5,501,306 A | 3/1996 | Martino |
| 5,518,683 A | 5/1996 | Taylor et al. |
| 5,518,816 A | 5/1996 | Shuford |
| 5,536,574 A | 7/1996 | Carter |
| 5,622,751 A | 4/1997 | Thebault et al. |
| 5,629,101 A | 5/1997 | Watremez |
| 5,643,663 A | 7/1997 | Bommier et al. |
| 5,682,596 A | 10/1997 | Taylor et al. |
| 5,686,144 A | 11/1997 | Thebault et al. |
| 5,714,244 A | 2/1998 | Delaval et al. |
| 5,725,955 A | 3/1998 | Tawil et al. |
| 5,759,622 A | 6/1998 | Stover |
| 5,856,015 A | 1/1999 | Buchanan |
| 5,871,820 A | 2/1999 | Hasz et al. |
| 5,878,843 A | 3/1999 | Saum |
| 5,878,849 A | 3/1999 | Prunier, Jr. et al. |
| 5,901,818 A | 5/1999 | Martino |
| 5,958,846 A | 9/1999 | Geriner |
| 5,965,266 A | 10/1999 | Goujard et al. |
| 5,971,113 A | 10/1999 | Kesavan et al. |
| 5,981,072 A | 11/1999 | Mercuri et al. |
| 6,016,450 A | 1/2000 | Corck |
| 6,036,762 A | 3/2000 | Sambasivan |
| 6,071,603 A | 6/2000 | Sakai et al. |
| 6,071,615 A | 6/2000 | Solow et al. |
| 6,331,362 B1 | 12/2001 | Dupel et al. |
| 6,346,331 B2 | 2/2002 | Harvey et al. |
| 6,460,374 B2 | 10/2002 | Sakai et al. |
| 6,461,415 B1 | 10/2002 | Sambasivan et al. |
| 6,497,307 B1 | 12/2002 | Schoo et al. |
| 6,551,701 B1 | 4/2003 | Nohr et al. |
| 6,551,709 B1 | 4/2003 | Stover |
| 6,555,173 B1 | 4/2003 | Forsythe et al. |
| 6,632,762 B1 | 10/2003 | Zaykoski et al. |
| 6,668,984 B2 | 12/2003 | Gray |
| 6,737,120 B1 | 5/2004 | Golecki |
| 6,740,408 B2 * | 5/2004 | Thebault ............... C04B 41/009 |
| | | 427/419.7 |
| 6,884,467 B2 | 4/2005 | Walker et al. |
| 6,896,968 B2 | 5/2005 | Golecki |
| 6,913,821 B2 | 7/2005 | Golecki et al. |
| 6,969,422 B2 | 11/2005 | Mazany et al. |
| 7,011,888 B2 | 3/2006 | Bauer et al. |
| 7,118,805 B2 | 10/2006 | Walker et al. |
| 7,160,618 B2 | 1/2007 | Walker et al. |
| 7,311,944 B2 | 12/2007 | Sambasivan et al. |
| 7,501,181 B2 * | 3/2009 | Walker .................... C04B 41/89 |
| | | 428/408 |
| 7,641,941 B2 | 1/2010 | Mazany et al. |
| 7,732,358 B2 | 6/2010 | Mazany et al. |
| 7,785,712 B2 | 8/2010 | Miller et al. |
| 7,938,877 B2 | 5/2011 | Liu et al. |
| 7,968,192 B2 | 6/2011 | Mazany et al. |
| 8,021,474 B2 | 9/2011 | Mazany et al. |
| 8,021,758 B2 | 9/2011 | Sambasivan et al. |
| 8,124,184 B2 | 2/2012 | Sambasivan et al. |
| 8,137,802 B1 | 3/2012 | Loehman et al. |
| 8,322,754 B2 | 12/2012 | Carcagno et al. |
| 8,962,083 B2 | 2/2015 | Murphy |
| 9,126,873 B2 | 9/2015 | Diss et al. |
| 9,388,087 B2 | 7/2016 | Don |
| 9,657,409 B2 | 5/2017 | Sandgren et al. |
| 9,758,678 B2 | 9/2017 | Nicolaus et al. |
| 9,790,133 B2 | 10/2017 | Mazany |
| 10,508,206 B2 | 12/2019 | Poteet |
| 10,526,253 B2 | 1/2020 | Poteet |
| 10,767,059 B2 * | 9/2020 | Poteet ................... F16D 69/023 |
| 10,941,486 B2 | 3/2021 | Mazany |
| 11,001,533 B2 | 5/2021 | Mazany et al. |
| 11,046,619 B2 | 6/2021 | Poteet |
| 11,072,565 B2 | 7/2021 | Weaver et al. |
| 11,091,402 B2 | 8/2021 | Poteet |
| 2002/0058576 A1 | 5/2002 | Mazany et al. |
| 2002/0096407 A1 | 7/2002 | Gray |
| 2002/0123592 A1 | 9/2002 | Zhang |
| 2003/0143436 A1 | 7/2003 | Forsythe et al. |
| 2004/0038032 A1 | 2/2004 | Walker et al. |
| 2004/0038043 A1 | 2/2004 | Golecki |
| 2004/0213906 A1 | 10/2004 | Mazany et al. |
| 2005/0022698 A1 | 2/2005 | Mazany et al. |
| 2006/0159909 A1 | 7/2006 | Asian |
| 2007/0026153 A1 | 2/2007 | Nicolaus et al. |
| 2007/0154712 A1 | 7/2007 | Mazany et al. |
| 2008/0058193 A1 | 3/2008 | Drake et al. |
| 2008/0142148 A1 | 6/2008 | Mazany |
| 2008/0311301 A1 | 12/2008 | Diss et al. |
| 2010/0044730 A1 | 2/2010 | Kwon et al. |
| 2010/0266770 A1 | 10/2010 | Mazany et al. |
| 2011/0311804 A1 | 12/2011 | Diss |
| 2013/0022826 A1 | 1/2013 | Kmetz |
| 2014/0196502 A1 | 7/2014 | Masuda |
| 2014/0227511 A1 | 8/2014 | Mazany |
| 2014/0349016 A1 * | 11/2014 | Don .................... C03C 10/0054 |
| | | 427/372.2 |
| 2015/0183998 A1 | 7/2015 | Belov et al. |
| 2015/0291805 A1 | 10/2015 | Nicolaus et al. |
| 2015/0362029 A1 | 12/2015 | Edwards et al. |
| 2016/0122231 A1 | 5/2016 | Ishihara |
| 2016/0280585 A1 | 9/2016 | Mazany |

(56) References Cited

U.S. PATENT DOCUMENTS

| | | | |
|---|---|---|---|
| 2016/0280612 A1 | 9/2016 | Mazany | |
| 2017/0036945 A1 | 2/2017 | Ishihara | |
| 2017/0267595 A1 | 9/2017 | Mazany | |
| 2017/0342555 A1 | 11/2017 | Mazany | |
| 2017/0349825 A1 | 12/2017 | Mazany | |
| 2017/0369713 A1 | 12/2017 | Poteet | |
| 2017/0369714 A1 | 12/2017 | Nathalie | |
| 2019/0055393 A1 | 2/2019 | Tsuji | |
| 2019/0233324 A1 | 8/2019 | Poteet et al. | |
| 2020/0148340 A1 | 5/2020 | Poteet et al. | |
| 2021/0087102 A1 | 3/2021 | Simard et al. | |
| 2021/0094887 A1 | 4/2021 | Poteet et al. | |
| 2021/0198159 A1 | 7/2021 | Poteet et al. | |

FOREIGN PATENT DOCUMENTS

| | | | |
|---|---|---|---|
| CN | 101898906 | 12/2010 | |
| CN | 102515850 | 6/2012 | |
| CN | 101712563 | 9/2012 | |
| CN | 103274760 | 9/2013 | |
| CN | 105237039 | 1/2016 | |
| CN | 105646007 | 4/2018 | |
| CN | 107935634 | 4/2018 | |
| CN | 107935634 A * | 4/2018 | ............ C04B 41/52 |
| CN | 107986807 | 10/2020 | |
| CN | 113831155 | 12/2021 | |
| EP | 200568 | 11/1986 | |
| EP | 0677499 | 10/1995 | |
| EP | 1043290 | 10/2000 | |
| EP | 1693262 | 8/2006 | |
| EP | 1834937 | 9/2007 | |
| EP | 1968914 | 7/2010 | |
| EP | 2684752 | 1/2014 | |
| EP | 2767529 | 8/2014 | |
| EP | 2774900 | 9/2014 | |
| EP | 2930162 | 10/2015 | |
| EP | 3072865 | 9/2016 | |
| EP | 3072866 | 9/2016 | |
| EP | 3222602 | 9/2017 | |
| EP | 3255027 | 12/2017 | |
| EP | 3282038 | 2/2018 | |
| EP | 3530637 | 8/2019 | |
| EP | 3590910 | 1/2020 | |
| EP | 3702342 | 9/2020 | |
| GB | 2468378 | 9/2010 | |
| JP | S56105442 | 8/1981 | |
| JP | 09301786 | 11/1997 | |
| JP | 2006036551 | 2/2006 | |
| KR | 20050022947 | 3/2005 | |
| WO | WO 9742135 | 11/1997 | |
| WO | WO 0051950 | 9/2000 | |
| WO | 03084899 | 10/2003 | |
| WO | WO 2007078419 | 7/2007 | |
| WO | 2010001021 | 1/2010 | |
| WO | WO 2014035413 | 3/2014 | |
| WO | WO 2015169024 | 11/2015 | |

OTHER PUBLICATIONS

U.S. Appl. No. 17/671,361. Oxidation Protection With Improved Water Resistance for Composites. filed Feb. 14, 2022. (Year: 2022).*
USPTO, Non-Final Office Action filed Dec. 19, 2018 in U.S. Appl. No. 15/169,219.
USPTO, Non-Final Office Action filed Dec. 19, 2018 in U.S. Appl. No. 15/169,257.
USPTO, Advisory Action filed Dec. 21, 2018 in U.S. Appl. No. 15/194,034.
USPTO, Advisory Action filed Dec. 28, 2018 in U.S. Appl. No. 15/076,348.
USPTO, Advisory Action filed Jan. 17, 2019 in U.S. Appl. No. 15/234,903.
USPTO, Notice of Allowance dated Apr. 3, 2019 in U.S. Appl. No. 15/169,257.
USPTO, Restriction/Election Requirement dated Apr. 5, 2019 in U.S. Appl. No. 15/380,442.
USPTO, Non-Final Office Action dated Apr. 16, 2019 in U.S. Appl. No. 15/076,348.
USPTO, Final Office Action dated May 15, 2019 in U.S. Appl. No. 15/194,034.
USPTO, Advisory Action dated May 17, 2019 in U.S. Appl. No. 15/174,537.
European Patent Office, European Office Action dated Oct. 22, 2021 in Application No. 19191306.0.
USPTO, Non-Final Office Action dated Nov. 18, 2021 in U.S. Appl. No. 15/076,348.
USPTO, Supplemental Notice of Allowance dated Mar. 2, 2021 in U.S. Appl. No. 16/453,593.
USPTO, Notice of Allowance dated Mar. 8, 2021 in U.S. Appl. No. 16/102,100.
USPTO, Decision on Appeal dated Apr. 5, 2021 in U.S. Appl. No. 15/076,348.
USPTO, Advisory Action dated Apr. 7, 2021 in U.S. Appl. No. 16/666,809.
USPTO, Notice of Allowance dated Apr. 15, 2021 in U.S. Appl. No. 16/668,852.
U.S. Appl. No. 17/308,776, filed May 5, 2021 titled "High Temperature Oxidation Protection for Carbon-Carbon Composites," 41 pages.
USPTO, Non-Final Office Action filed Jun. 7, 2019 in U.S. Appl. No. 15/174,537.
USPTO, Notice of Allowance dated Jun. 17, 2019 in U.S. Appl. No. 15/169,257.
European Patent Office, European Office Action dated Jun. 21, 2019 in Application No. 19155021.9.
USPTO, Notice of Allowance filed Jun. 26, 2019 in U.S. Appl. No. 15/169,219.
USPTO, Pre-Interview First Office Action dated Jul. 26, 2019 in U.S. Appl. No. 15/380,442.
USPTO, Notice of Allowance dated Aug. 13, 2019 in U.S. Appl. No. 15/194,034.
USPTO, Pre-Interview First Office Action dated Apr. 17, 2020 in U.S. Appl. No. 15/886,671.
USPTO, Restriction/Election Requirement dated Apr. 30, 2020 in U.S. Appl. No. 16/029,134.
USPTO, Corrected Notice of Allowance dated May 28, 2020 in U.S. Appl. No. 16/116,665.
USPTO, First Action Interview Office Action dated Jun. 4, 2020 in U.S. Appl. No. 15/886,671.
International Search Report and Written Opinion dated Apr. 20, 2005 in Application No. PCT/US2004/012222.
International Preliminary Report on Patentability dated Aug. 18, 2005 in Application No. PCT/US2004/012222.
International Search Report and Written Opinion dated Jul. 3, 2007 in Application No. PCT/US2006/043343.
Office Action dated Jan. 4, 2008 in Application No. 04816727.4.
Office Action dated Feb. 26, 2008 in U.S. Appl. No. 10/829,144.
International Preliminary Report on Patentability dated Mar. 12, 2008 in Application No. PCT/US2006/043343.
Final Office Action dated Jul. 16, 2008 in U.S. Appl. No. 10/829,144.
Office Action dated Oct. 24, 2008 in U.S. Appl. No. 10/829,144.
Communication Pursuant to Article 94(3) EPC dated Oct. 28, 2008 in European Application No. 06837063.4.
Restriction Requirement dated Feb. 5, 2009 in U.S. Appl. No. 11/315,592.
Final Office Action dated Jan. 29, 2009 in U.S. Appl. No. 10/829,144.
Communication Pursuant to Article 94(3) EPC dated Feb. 9, 2009 in European Application No. 06837063.4.
Office Action dated May 29, 2009 in U.S. Appl. No. 10/829,144.
Office Action dated Jun. 9, 2009 in U.S. Appl. No. 11/315,592.
Notice of Allowance dated Oct. 1, 2009 in U.S. Appl. No. 10/829,144.
Final Office Action dated Dec. 11, 2009 in U.S. Appl. No. 11/315,592.
Communication under Rule 71(3) EPC dated Feb. 4, 2010 in European Application No. 06837063.4.
Advisory Action dated Feb. 25, 2010 in U.S. Appl. No. 11/315,592.

(56) References Cited

OTHER PUBLICATIONS

Office Action dated Apr. 1, 2010 in U.S. Appl. No. 11/315,592.
Partial European Search Report dated Oct. 29, 2010 in European Application No. 10169627.6.
Office Action dated Feb. 4, 2011 in U.S. Appl. No. 12/619,061.
Office Action dated Feb. 22, 2011 in U.S. Appl. No. 12/829,178.
Extended European Search Report dated May 4, 2011 in European Application No. 10169627.6.
Final Office Action dated Aug. 19, 2011 in U.S. Appl. No. 12/829,178.
Advisory Action dated Oct. 27, 2011 in U.S. Appl. No. 12/829,178.
U.S. Appl. No. 15/076,348, filed Mar. 21, 2016 titled "High Temperature Oxidation Protection for Composites," 42 pages.
U.S. Appl. No. 15/169,219, filed May 31, 2016 titled "High Temperature Oxidation Protection for Composites," 37 pages.
U.S. Appl. No. 15/169,257, filed May 31, 2016 titled "High Temperature Oxidation Protection for Composites," 40 pages.
U.S. Appl. No. 15/174,537, filed Jun. 6, 2016 titled "Nanocomposite Coatings for Oxidation Protection for Composites," 44 pages.
U.S. Appl. No. 15/194,034, filed Jun. 27, 2016 titled "High Temperature Oxidation Protection for Composites," 49 pages.
U.S. Appl. No. 15/234,903, filed Aug. 11, 2016 titled "High Temperature Oxidation Protection for Composites," 41 pages.
U.S. Appl. No. 15/380,442, filed Dec. 15, 2016 titled "High Temperature Oxidation Protection for Composites," 41 pages.
Extended European Search Report dated Jul. 26, 2016 in European Application No. 16161832.7.
Restriction Requirement dated Nov. 7, 2016 in U.S. Appl. No. 14/671,637.
Preinterview First Office Action dated Mar. 6, 2017 in U.S. Appl. No. 14/671,637.
First Action Interview Office Action dated May 12, 2017 in U.S. Appl. No. 14/671,637.
Restriction Requirement dated Jan. 5, 2018 in U.S. Appl. No. 15/076,348.
Extended European Search Report dated Aug. 2, 2017 in European Application No. 17159538.2.
Rovner; "A Haven for Glass, Ceramics"; Science & Technology; May 24, 2004; pp. 33-39.
Air Products and Chemicals, Inc., "Complete Product Offering," 4 pages, retrieved from www.airproducts.com on Jun. 28, 2004.
McKee, Chemistry and Physics of Carbon, vol. 16, P.L. Walker and P.A. Thrower eds., Marcel Dekker, 1981, p. 30-42.
Sosman, "The Common Refractory Oxides," The Journal of Industrial and Engineering Chemistry, vol. 8, No. 11, Nov. 1916, pp. 985-990.
Almatis Website, C-333, Accessed Feb. 8, 2011, p. 1.
Montedo et al., Crystallisation Kinetics of a B-Spodumene-Based Glass Ceramic, Advances in Materials Science and Engineering, pp. 1-9, vol. 2012, Article ID 525428, Hindawi Publishing Corporation.
Extended European Search Report dated Oct. 9, 2017 in European Application No. 17173709.1.
Extended European Search Report dated Oct. 17, 2017 in European Application No. 17173707.5.
Sun Lee W et al., "Comparative study of thermally conductive fillers in underfill for the electronic components", Diamond and Related Materials, Elsevier Science Publishers, Amsterdam, NL, vol. 14, No. 10, Oct. 1, 2005 (Oct. 1, 2005), pp. 1647-1653.
Rockwood Lithium, Spodumene Concentrate SC 7.5 premium, Aug. 2015, pp. 1-2, The Lithium Company.
D.D.L. Chung: "Acid Aluminum Phosphate for the Binding and Coating of Materials", Journal of Materials Science, vol. 38, No. 13, 2003, pp. 2785-2791.
Extended European Search Report dated Nov. 6, 2017 in European Application No. 17174481.6.
Final Office Action dated Jan. 17, 2018 in U.S. Appl. No. 14/671,637.
Communication Pursuant to Article 94(3) dated Jan. 3, 2018 in European Application No. 16161832.7.
Extended European Search Report dated Nov. 20, 2017 in European Application No. 17175809.7.
Extended European Search Report dated Nov. 20, 2017 in European Application No. 17178011.7.
Partial European Search Report dated Jan. 13, 2018 in European Application No. 17183478.1.
Advisory Action dated Mar. 30, 2018 in U.S. Appl. No. 14/671,637.
Non Final Office Action dated May 1, 2018 in U.S. Appl. No. 15/076,348.
Restriction/Election Requirement dated May 24, 2018 in U.S. Appl. No. 15/174,537.
Non Final Office Action dated Mar. 28, 2018 in U.S. Appl. No. 15/234,903.
European Search Report dated Apr. 11, 2018 in European Application No. 17183478.1-1103.
European Search Report dated Apr. 13, 2018 in European Application No. 17207767.9-1106.
USPTO, Restriction/Election Requirement dated Jun. 19, 2018 in U.S. Appl. No. 15/194,034.
USPTO, Notice of Allowance dated Jun. 5, 2018 in U.S. Appl. No. 14/671,637.
USPTO, Corrected Notice of Allowance dated Jun. 22, 2018 in U.S. Appl. No. 14/671,637.
USPTO, Non Final Office Action dated Jul. 27, 2018 in U.S. Appl. No. 15/174,537.
Steven A. Poteet, et al., U.S. Appl. No. 16/029,134, filed Jul. 6, 2018 titled "High Temperature Oxidation Protection for Composites ," 43 pages.
Steven A. Poteet, et al., U.S. Appl. No. 15/886,671, filed Feb. 1, 2018 titled "High Temperature Oxidation Protection for Composites ," 45 pages.
European Patent Office, European Office Action dated Jul. 16, 2018 in Application No. 17174481.6.
Steven A. Poteet, U.S. Appl. No. 16/102,100, filed Aug. 13, 2018 titled "High Temperature Oxidation Protection for Composites ," 47 pages.
USPTO, Notice of Allowance dated Aug. 24, 2018 in U.S. Appl. No. 14/671,637.
Anthony Mazany, U.S. Appl. No. 16/116,665, filed Aug. 29, 2018 titled " Formulations for Oxidation Protection of Composite Articles", 30 pages.
USPTO, Restriction/Election Requirement dated Aug. 30, 2018 in U.S. Appl. No. 15/169,219.
USPTO, Restriction/Election Requirement dated Aug. 30, 2018 in U.S. Appl. No. 15/169,257.
USPTO, Final Office Action dated Oct. 26, 2018 in U.S. Appl. No. 15/234,903.
USPTO, Final Office Action dated Nov. 5, 2018 in U.S. Appl. No. 15/076,348.
European Patent Office, European Search Report dated May 10, 2021 in Application No. 20216996.7.
USPTO, Corrected Notice of Allowance dated Jun. 4, 2021 in U.S. Appl. No. 16/102,100.
European Patent Office, European Office Action dated Jul. 7, 2021 in Application No. 17183478.1.
USPTO, Corrected Notice of Allowance dated Jun. 11, 2021 in U.S. Appl. No. 16/668,852.
USPTO, Notice of Allowance dated Jul. 12, 2021 in U.S. Appl. No. 16/666,809.
USPTO, Final Office Action dated Sep. 9, 2020 in U.S. Appl. No. 15/886,671.
USPTO, Non-Final Office Action dated Oct. 29, 2020 in U.S. Appl. No. 16/666,809.
USPTO, Notice of Allowance dated Feb. 1, 2022 in U.S. Appl. No. 17/185,016.
U.S. Appl. No. 17/527,423, filed Nov. 16, 2021 titled "High Temperature Oxidation Protection for Carbon-Carbon Composites," 41 pages.
European Patent Office, European Search Report dated Nov. 25, 2019 in Application No. 19184523.9.
USPTO, Restriction/Election Requirement dated Dec. 13, 2019 in U.S. Appl. No. 15/886,671.
European Patent Office, European Search Report dated Dec. 13, 2019 in Application No. 19191306.0.

(56) References Cited

OTHER PUBLICATIONS

European Patent Office, European Office Action dated Oct. 22, 2020 in Application No. 17173709.1.
USPTO, Advisory Action dated Nov. 17, 2020 in U.S. Appl. No. 15/886,671.
USPTO, Non-Final Office Action filed Nov. 17, 2020 in U.S. Appl. No. 16/102,100.
USPTO, Notice of Allowance dated Dec. 7, 2020 in U.S. Appl. No. 16/589,368.
USPTO, Notice of Allowance dated Jan. 1, 2021 in U.S. Appl. No. 16/453,593.
European Patent Office, European Search Report dated Aug. 28, 2019 in Application No. 17173707.5.
USPTO, Final Office Action filed Aug. 30, 2019 in U.S. Appl. No. 15/234,903.
The National Academics Press, Committee on Advanced Fibers for High-Temperature Ceramic Composites, Ceramic Fibers and Coatings: Advanced Materials for the Twenty-First Century, Chapter 6: Interfacial Coatings, (1998), p. 1-48 (Year: 1998).
USPTO, Notice of Allowance dated Sep. 25, 2019 in U.S. Appl. No. 15/380,442.
USPTO, Supplemental Notice of Allowance filed Oct. 2, 2019 in U.S. Appl. No. 15/169,219.
Steven A. Poteet, U.S. Appl. No. 16/666,809, filed Oct. 29, 2019 titled "High Temperature Oxidation Protection for Composites," 45 pages.
USPTO, Advisory Action filed Nov. 20, 2019 in U.S. Appl. No. 15/234,903.
European Patent Office, European Search Report dated Nov. 19, 2020 in Application No. 17178011.7.
USPTO, Supplemental Notice of Allowance dated Feb. 9, 2021 in U.S. Appl. No. 16/589,368.
USPTO, Supplemental Notice of Allowance dated Feb. 9, 2021 in U.S. Appl. No. 16/453,593.
USPTO, Final Office Action dated Feb. 2, 2021 in U.S. Appl. No. 16/666,809.
USPTO, Notice of Allowance dated Feb. 21, 2020 in U.S. Appl. No. 16/116,665.
European Patent Office, European Search Report dated Mar. 23, 2020 in Application No. 19207148.8.
USPTO, Notice of Allowance filed May 1, 2020 in U.S. Appl. No. 15/234,903.
USPTO, Corrected Notice of Allowance filed Jul. 9, 2020 in U.S. Appl. No. 15/234,903.
USPTO, Corrected Notice of Allowance filed Aug. 7, 2020 in U.S. Appl. No. 15/234,903.
USPTO, Restriction/Election Requirement filed Jul. 14, 2020 in U.S. Appl. No. 16/102,100.
USPTO, Final Office Action filed Feb. 14, 2019 in U.S. Appl. No. 15/174,537.
USPTO, Non-Final Office Action filed Feb. 25, 2019 in U.S. Appl. No. 15/234,903.
USPTO, First Action Interview Office Action dated May 9, 2022 in U.S. Appl. No. 16/029,134.
USPTO, Notice of Allowance dated May 25, 2022 in U.S. Appl. No. 17/330,163.
U.S. Appl. No. 17/527,423, filed Nov. 16, 2021 entitled "High Temperature Oxidation Protection for Carbon-Carbon Composites," 41 pages.
USPTO, Supplemental Notice of Allowance dated Feb. 24, 2022 in U.S. Appl. No. 17/185,016.
USPTO, Pre-Interview First Office Action dated Mar. 21, 2022 in U.S. Appl. No. 16/029,134.
USPTO, Notice of Allowance dated Jul. 8, 2022 in U.S. Appl. No. 17/330,163.
USPTO, Notice of Allowance dated Jun. 29, 2022 in U.S. Appl. No. 17/378,207.
USPTO, Corrected Notice of Allowance dated Jul. 19, 2022 in U.S. Appl. No. 17/378,207.
USPTO, Final Office Action dated Aug. 22, 2022 in U.S. Appl. No. 16/029,134.
USPTO, Notice of Allowance dated Aug. 31, 2022 in U.S. Appl. No. 17/330,163.
European Patent Office, European Search Report dated Sep. 23, 2022 in Application No. 22171665.7.
USPTO, Corrected Notice of Allowance dated Oct. 17, 2022 in U.S. Appl. No. 17/378,207.
European Patent Office, European Office Action dated Nov. 24, 2022 in Application No. 19184523.9.
European Patent Office, European Office Action dated Jan. 26, 2023 in Application No. 19207148.8.

* cited by examiner

HIGH TEMPERATURE OXIDATION PROTECTION FOR COMPOSITES

FIELD

The present disclosure relates generally to composites and, more specifically, to oxidation protection systems for carbon-carbon composite structures.

BACKGROUND

Oxidation protection systems for carbon-carbon composites are typically designed to minimize loss of carbon material due to oxidation at operating conditions, which include temperatures of 900° C. (1652° F.) or higher. Phosphate-based oxidation protection systems may reduce infiltration of oxygen and oxidation catalysts into the composite structure. However, despite the use of such oxidation protection systems, significant oxidation of the carbon-carbon composites may still occur during operation of components such as, for example, aircraft braking systems. Cracks in the oxidation protection system may expose the composite to oxidation. In addition, at such high operating temperatures, phosphate glass-based oxidation protection systems (OPS) applied to non-wear surfaces of brake disks may experience a decreasing viscosity, which may cause the OPS to migrate away from non-wear surface edges proximate to a wear surface of the brake disk, leaving the composite material at or proximate to the non-wear surface edges vulnerable to oxidation.

SUMMARY

A method for forming an oxidation protection system on a composite structure is provided. In various embodiments, the method may comprise applying a boron slurry to the composite structure, wherein the boron slurry comprises a boron compound and a first carrier fluid; heating the composite structure to a temperature sufficient to form a boron layer on the composite structure; applying a silicon slurry to the composite structure, wherein the silicon slurry comprises a silicon compound and a second carrier fluid; and/or heating the composite structure to a temperature sufficient to form a silicon layer on the composite structure. In various embodiments, the method may further comprise applying a first sealing slurry to the silicon layer; and heating the composite structure to a temperature sufficient to form a first sealing layer. In various embodiments, the method may further comprise applying a second sealing slurry to the first sealing layer; and heating the composite structure to a temperature sufficient to form a second sealing layer. In various embodiments, applying the boron slurry, applying the silicon slurry, applying the first sealing slurry, and applying the second sealing slurry each comprise at least one of brushing or spraying.

In various embodiments, the boron compound may comprise at least one of titanium diboride, boron nitride, boron carbide, or zirconium boride. In various embodiments, the silicon compound may comprise at least one of silicon carbide, silicon dioxide, a silicide compound, silicon, fumed silica, or silicon carbonitride. In various embodiments, the boron layer may comprise between one and four milligrams of boron compound per square centimeter. In various embodiments, the silicon layer may comprise between one and six milligrams of silicon compound per square centimeter. In various embodiments, at least one of the boron compound or the silicon compound comprises particles having a particle size between 100 nanometers and 100 micrometers. In various embodiments, the first sealing slurry may comprise monoaluminum phosphate solution, phosphoric acid, a carrier fluid, and a silicon-based surfactant. In various embodiments, the second sealing slurry may comprise monoaluminum phosphate solution and phosphoric acid. In various embodiments, the first sealing slurry may be a phosphate glass sealing slurry comprising a pre-slurry composition, wherein the pre-slurry composition comprises a phosphate glass composition and a third carrier fluid.

In various embodiments, an oxidation protection system disposed on an outer surface of a substrate may comprise a boron layer comprising a boron compound disposed on the substrate; a silicon layer comprising a silicon compound disposed on the boron layer; and/or a first sealing layer comprising monoaluminum phosphate and phosphoric acid disposed on the silicon layer. In various embodiments, the oxidation protection system may further comprise a second sealing layer comprising monoaluminum and phosphoric acid disposed on the first sealing layer.

In various embodiments, the boron compound may comprise at least one of titanium diboride, boron nitride, boron carbide, or zirconium boride, and the silicon compound may comprise at least one of silicon carbide, silicon dioxide, a silicide compound, silicon, fumed silica, or silicon carbonitride. In various embodiments, the boron layer may comprise between one and four milligrams of boron compound per square centimeter. In various embodiments, the silicon layer may comprise between one and six milligrams of silicon compound per square centimeter. In various embodiments, the first sealing layer may comprise monoaluminum phosphate, phosphoric acid, and a silicon-based surfactant, and the second sealing slurry may comprise monoaluminum phosphate and phosphoric acid.

In various embodiments, an aircraft brake disk may comprise a carbon-carbon composite structure comprising a non-wear surface; and an oxidation protection system disposed on the non-wear surface. The oxidation protection system may comprise a boron layer comprising a boron compound disposed on the composite structure; a silicon layer comprising a silicon compound disposed on the boron layer; a first sealing layer disposed on the silicon layer, wherein the first sealing layer comprises monoaluminum phosphate, phosphoric acid, and a surfactant; and/or a second sealing layer disposed on the first sealing layer, wherein the second sealing layer comprises monoaluminum phosphate and phosphoric acid.

In various embodiments, the boron compound may comprise at least one of titanium diboride, boron nitride, boron carbide, or zirconium boride, and the silicon compound may comprise at least one of silicon carbide, silicon dioxide, a silicide compound, silicon, fumed silica, or silicon carbonitride.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Value ranges include their minimum and maximum limits. Also, any reference to attached, fixed, connected, or the like may include permanent, removable, temporary, partial, full and/or any other possible attachment option.

Figure 1A:
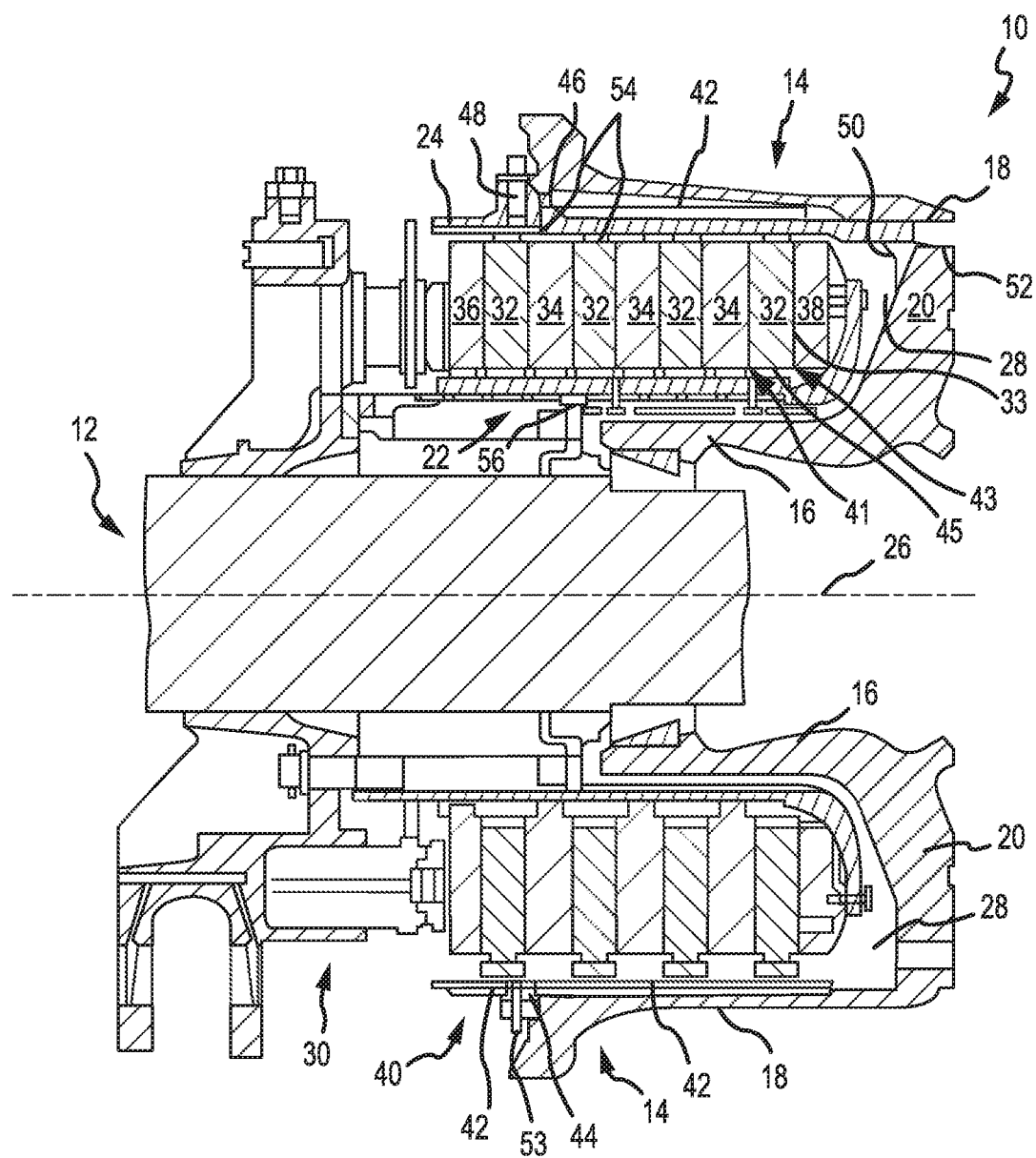
FIG. 1A illustrates a cross sectional view of an aircraft wheel braking assembly, in accordance with various embodiments.
Figure 1B:
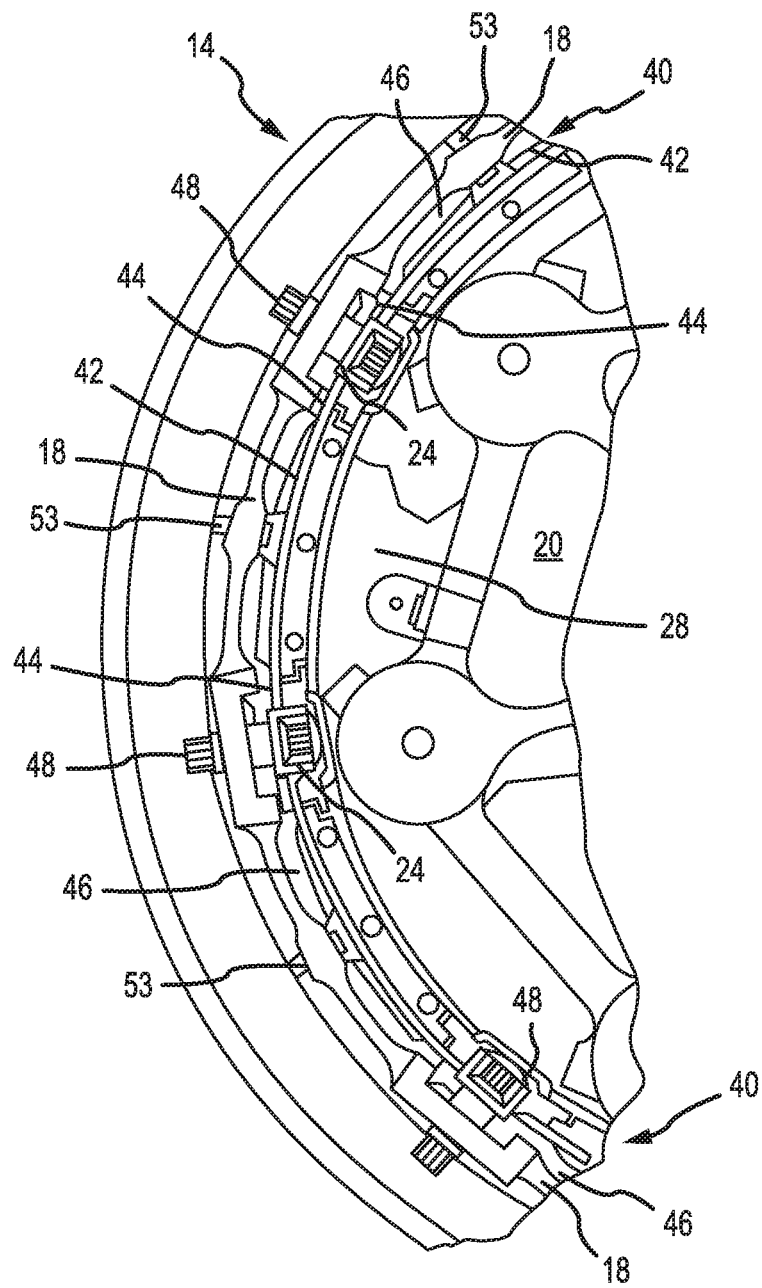
FIG. 1B illustrates a partial side view of an aircraft wheel braking assembly, in accordance with various embodiments.

With initial reference to FIGS. 1A and 1B, aircraft wheel braking assembly 10 such as may be found on an aircraft, in accordance with various embodiments is illustrated. Aircraft wheel braking assembly may, for example, comprise a bogie axle 12, a wheel 14 including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield segments 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56. FIG. 1B illustrates a portion of aircraft wheel braking assembly 10 as viewed into wheel well 18 and wheel well recess 28.

In various embodiments, the various components of aircraft wheel braking assembly 10 may be subjected to the application of compositions and methods for protecting the components from oxidation.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck such as a bogie beam or other landing gear strut, such that torque take-out assembly 22 and stators 34 are prevented from rotating during braking of the aircraft.

Carbon-carbon composites (also referred to herein as composite structures, composite substrates, and carbon-carbon composite structures, interchangeably) in the friction disks may operate as a heat sink to absorb large amounts of kinetic energy converted to heat during slowing of the aircraft. Heat shield 40 may reflect thermal energy away from wheel well 18 and back toward rotors 32 and stators 34. With reference to FIG. 1A, a portion of wheel well 18 and torque bar 24 is removed to better illustrate heat shield 40 and heat shield segments 42. With reference to FIG. 1B, heat shield 40 is attached to wheel 14 and is concentric with wheel well 18. Individual heat shield segments 42 may be secured in place between wheel well 18 and rotors 32 by respective heat shield carriers 44 fixed to wheel well 18. Air gap 46 is defined annularly between heat shield segments 42 and wheel well 18.

Torque bars 24 and heat shield carriers 44 can be secured to wheel 14 using bolts or other fasteners. Torque bar bolts 48 can extend through a hole formed in a flange or other mounting surface on wheel 14. Each torque bar 24 can optionally include at least one torque bar pin 50 at an end opposite torque bar bolts 48, such that torque bar pin 50 can be received through wheel web hole 52 in web 20. Heat shield segments 42 and respective heat shield carriers 44 can then be fastened to wheel well 18 by heat shield fasteners 53.

Under the operating conditions (e.g., high temperature) of aircraft wheel braking assembly 10, carbon-carbon composites may be prone to material loss from oxidation of the carbon. For example, various carbon-carbon composite components of aircraft wheel braking assembly 10 may experience both catalytic oxidation and inherent thermal oxidation caused by heating the composite during operation. In various embodiments, composite rotors 32 and stators 34 may be heated to sufficiently high temperatures that may oxidize the carbon surfaces exposed to air (e.g., oxygen). At elevated temperatures, infiltration of air and contaminants may cause internal oxidation and weakening, especially in and around rotor lugs 54 or stator slots 56 securing the friction disks to the respective torque bar 24 and torque take-out assembly 22. Because carbon-carbon composite components of aircraft wheel braking assembly 10 may retain heat for a substantial time period after slowing the aircraft, oxygen from the ambient atmosphere may react with the carbon matrix and/or carbon fibers to accelerate material loss. Further, damage to brake components may be caused by the oxidation enlargement of cracks around fibers or enlargement of cracks in a reaction-formed porous barrier coating (e.g., a silicon-based barrier coating) applied to the carbon-carbon composite.

Elements identified in severely oxidized regions of carbon-carbon composite brake components include potassium (K) and sodium (Na). These alkali contaminants may come into contact with aircraft brakes as part of cleaning or de-icing materials. Other sources include salt deposits left from seawater or sea spray. These and other contaminants (e.g. Ca, Fe, etc.) can penetrate and leave deposits in pores of carbon-carbon composite aircraft brakes, including the substrate and any reaction-formed porous barrier coating. When such contamination occurs, the rate of carbon loss by oxidation can be increased by one to two orders of magnitude.

In various embodiments, components of aircraft wheel braking assembly 10 may reach operating temperatures in the range from about 100° C. (212° F.) up to about 900° C. (1652° F.), or higher (e.g., 1093° C. (2000° F.) on a wear surface of a brake disk). However, it will be recognized that the oxidation protection systems compositions and methods of the present disclosure may be readily adapted to many parts in this and other braking assemblies, as well as to other carbon-carbon composite structures susceptible to oxidation losses from infiltration of atmospheric oxygen and/or catalytic contaminants.

Figure 2A:
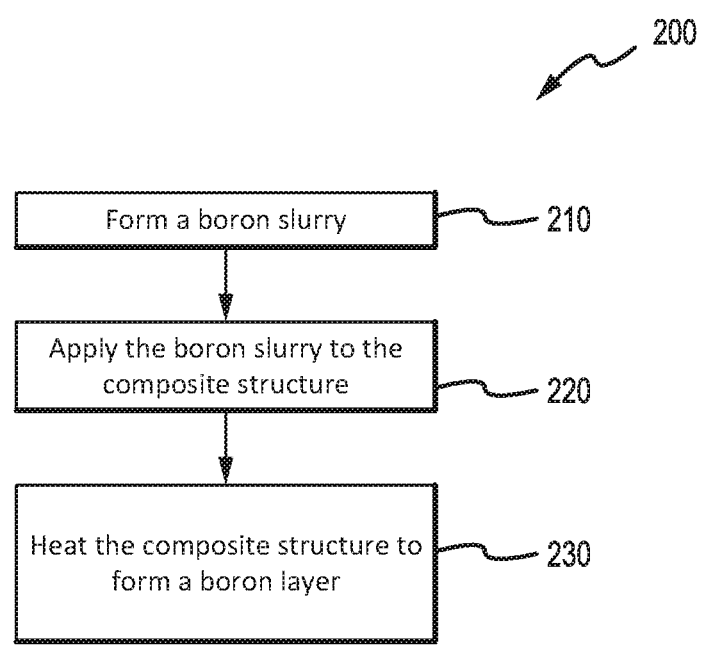
FIGS. 2A, 2B, and 2C illustrate methods for coating a composite structure, in accordance with various embodiments.

In various embodiments, a method for limiting an oxidation reaction in a substrate (e.g., a composite structure) may comprise forming an oxidation protection system on the composite structure. With initial reference to FIGS. 1A and 2A, a method 200 for coating a composite structure in accordance with various embodiments is illustrated. Method 200 may, for example, comprise applying an oxidation protection system to non-wearing surfaces of carbon-carbon composite brake components, such as non-wear surfaces 45 and/or rotor lugs 54. Non-wear surface 45, as labeled in FIG. 1A, simply references an exemplary non-wear surface on a brake disk, but non-wear surfaces similar to non-wear surface 45 may be present on any brake disks (e.g., rotors 32, stators 34, pressure plate 36, end plate 38, or the like). In various embodiments, method 200 may be used on the back face of pressure plate 36 and/or end plate 38, an inner diameter (ID) surface of stators 34 including stator slots 56, as well as outer diameter (OD) surfaces of rotors 32 including lugs 54. The oxidation protection system of method 200 may be applied to preselected regions of a carbon-carbon composite structure that may be otherwise susceptible to oxidation. For example, aircraft brake disks may have the oxidation protection system applied on or proximate stator slots 56, rotor lugs 54, and/or non-wear surface 45.

In various embodiments, method 200 may comprise forming a boron slurry (step 210) by combining a boron compound with a first carrier fluid (such as, for example, water). In various embodiments, the boron compound may comprise at least one boron-comprising refractory material (e.g., ceramic materials). In various embodiments, the boron compound may comprise titanium diboride, boron nitride, boron carbide, and/or zirconium boride.

The weight percentage of the boron compound within the boron slurry may be any suitable weight percentage for the desired application. In various embodiments, the boron slurry may comprise from 10% to 80% by weight boron compound, from 20% to 70% by weight boron compound, from 30% to 60% by weight boron compound, from 30% to 50% by weight boron compound, about 40% by weight boron compound, and/or about 50% by weight boron compound. As used in this context only, the term "about" means plus or minus 5 weight percent. The remaining weight percent of the boron slurry other than the boron compound may comprise the carrier fluid and/or any other suitable additives.

In various embodiments, method 200 further comprises applying the boron slurry to a composite structure (step 220). Applying the boron slurry may comprise, for example, spraying or brushing the boron slurry to an outer surface of the composite structure. Embodiments in which the carrier fluid for the boron slurry is water causes the aqueous boron slurry to be more suitable for spraying or brushing application processes. In various embodiments, the application of the boron slurry to the composite structure may not comprise chemical vapor deposition (CVD), thus saving the significant monetary expense associated with CVD. Any suitable manner of applying the boron slurry to the composite structure is within the scope of the present disclosure, except in various embodiments, CVD. As referenced herein, the composite structure may refer to a carbon-carbon composite structure.

In various embodiments in which the boron compound comprises particles, the particle size may be between 100 nanometers (nm) and 100 micrometers (μm) (between $3.9 \times 10^{-6}$ inch and 0.0039 inch), between 500 nm and 100 μm (between $2 \times 10^{-5}$ inch and 0.0039 inch), between 500 nm and 1 μm (between $2 \times 10^{-5}$ inch and $3.9 \times 10^{-5}$ inch), between 1 μm and 50 μm (between $3.9 \times 10^{-5}$ inch and 0.002 inch), between 1 μm and 20 μm (between $3.9 \times 10^{-5}$ inch and 0.0008 inch), and/or between 1 μm and 10 μm (between $3.9 \times 10^{-5}$ inch and 0.0004 inch).

In various embodiments, method 200 may further comprise a step 230 of heating the composite structure to form a boron layer on the composite structure. In various embodiments, the boron layer may be formed directly adjacent to the composite structure. The heating of the composite structure may remove the carrier fluid from the boron slurry to form the boron layer. The composite structure may be heated (e.g., dried or baked) at a temperature in the range from about 50° C. (122° F.) to about 200° C. (292° F.). In various embodiments, the composite structure may be heated at a greater temperature (e.g., up to 1000° C. (1832° F.)) to form the boron layer on the composite structure. Step 230 may, for example, comprise heating the composite structure for a period between about five minutes to about 0.5 hour, or between about 0.5 hour and about 8 hours, wherein the term "about" in this context only means plus or minus ten percent of the associated value. The boron layer may also be referred to as a coating (e.g., a boron coating).

Step 230 may be performed in an inert environment, such as under a blanket of inert gas or less reactive gas (e.g., nitrogen, argon, other noble gases and the like). For example, a composite structure may be pretreated or warmed prior to application of the boron slurry to aid in the penetration of the boron slurry. The temperature rise may be controlled at a rate that removes water without boiling, and provides temperature uniformity throughout the composite structure.

In various embodiments, the boron layer may comprise a thickness (i.e., the height of the boron layer extending from the composite structure) of between 1 μm and 10 μm (between $3.9 \times 10^{-5}$ inch and 0.0004 inch), between 1 μm and 5 μm (between $3.9 \times 10^{-5}$ inch and 0.0002 inch), and/or between 2 μm and 4 μm (between $7.9 \times 10^{-5}$ inch and 0.0002 inch).

In various embodiments, the boron layer disposed on the composite structure may comprise from 1 to 10 milligrams (mg) of the boron compound (from $2.2 \times 10^{-6}$ to $2.2 \times 10^{-5}$ pound) per square centimeter ($cm^2$), from 1 to 7 mg of the boron compound (from $2.2 \times 10^{-6}$ to $1.5 \times 10^{-5}$ pound) per $cm^2$, from 1 to 5 mg of the boron compound (from $2.2 \times 10^{-6}$ to $1.1 \times 10^{-5}$ pound) per $cm^2$, and/or from 1 to 4 mg of the boron compound (from $2.2 \times 10^{-6}$ to $8.8 \times 10^{-6}$ pound) per $cm^2$.

Figure 2B:
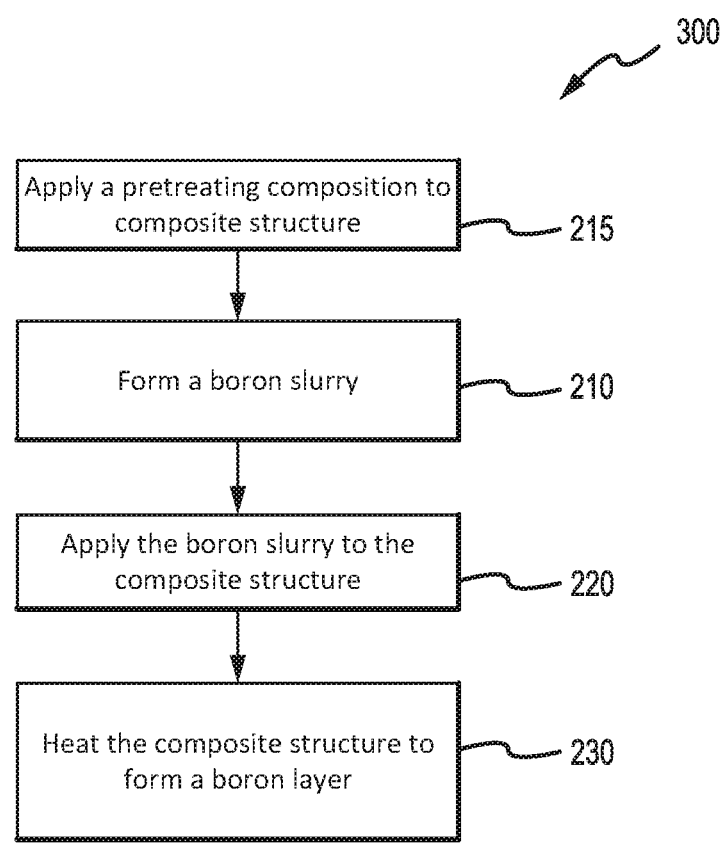

In various embodiments, and with reference now to FIG. 2B, method 300, which comprises steps also found in method 200, may further comprise applying a pretreating composition (step 215) prior to applying the boron slurry. Step 215 may, for example, comprise applying a first pretreating composition to an outer surface of a composite structure (e.g., a non-wear surface 45, as shown in FIG. 1), such as a component of aircraft wheel braking assembly 10. In various embodiments, the first pretreating composition may comprise an aluminum oxide in water. For example, the aluminum oxide may comprise an additive, such as a nanoparticle dispersion of aluminum oxide (for example, NanoBYK-3600®, sold by BYK Additives & Instruments). The first pretreating composition may further comprise a surfactant or a wetting agent. The composite structure may be porous, allowing the pretreating composition to penetrate at least a portion of the pores of the composite structure.

In various embodiments, after applying the first pretreating composition, the component may be heated to remove water and fix the aluminum oxide in place. For example, the component may be heated between about 100° C. (212° F.) and 200° C. (392° F.), and further, between 100° C. (212° F.) and 150° C. (302° F.). The first pretreating composition, in various embodiments, may be disposed between the composite structure and the boron layer.

Step 215 may further comprise applying a second pretreating composition to the composite structure. In various embodiments, the second pretreating composition may comprise a phosphoric acid and an aluminum phosphate, aluminum hydroxide, and/or aluminum oxide. The second pretreating composition may further comprise, for example, a second metal salt such as a magnesium salt. In various embodiments, the aluminum to phosphorus molar ratio of the aluminum phosphate is 1 to 3. Further, the second pretreating composition may also comprise a surfactant or a wetting agent. In various embodiments, the second pretreating composition is applied directly to the composite structure and/or atop the first pretreating composition, if a first pretreating composition is applied. The composite structure may then, for example, be heated. In various embodiments, the composite structure may be heated between about 600° C. (1112° F.) and about 800° C. (1472° F.), and further, between about 650° C. (1202° F.) and 750° C. (1382° F.).

Figure 2C:
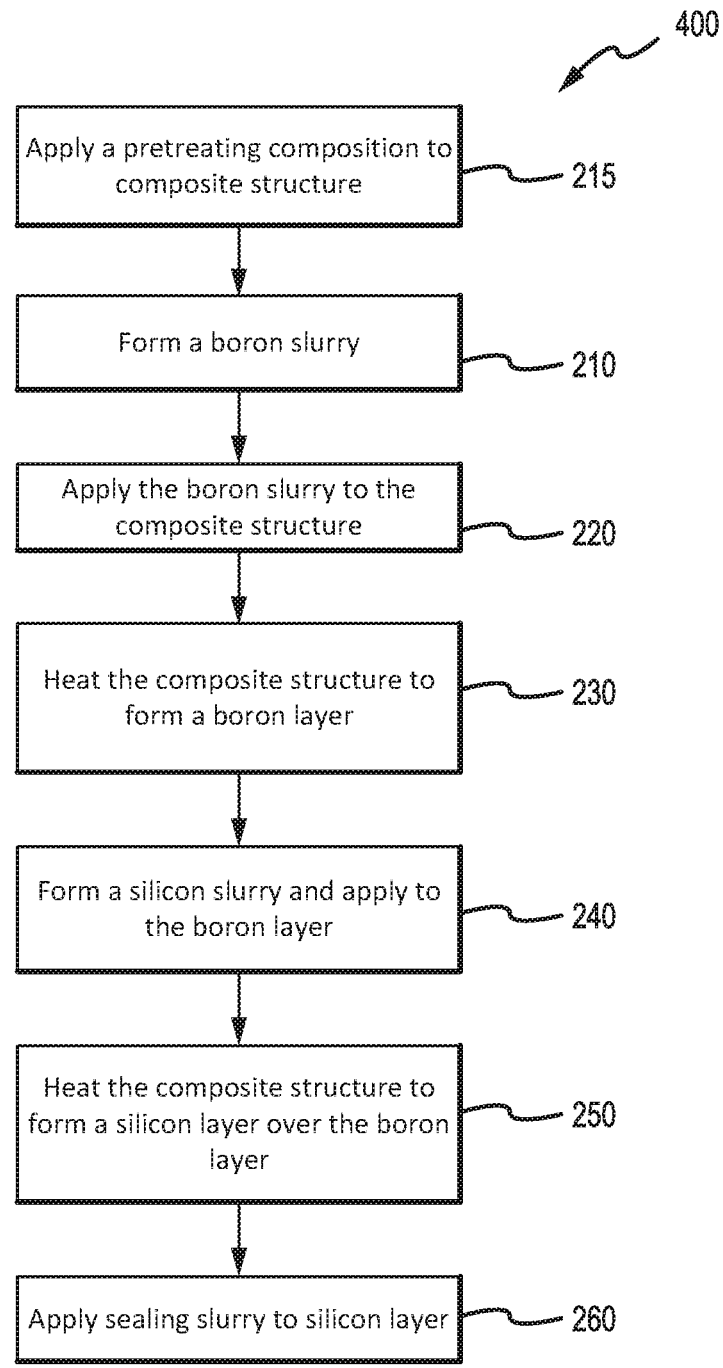

In various embodiments and with reference now to FIG. 2C, method 400 may further comprise a step 240 of forming a silicon slurry by combining a silicon compound with a second carrier fluid (such as, for example, water). In various embodiments, the silicon compound may comprise silica ($SiO_2$), silica formers, and/or other compounds comprising silicon. A silica former may be a compound which may react (e.g., oxidize) to form silica, for example, a silicide (e.g., a metal silicide), silicon, fumed silica, silicon carbide, silicon carbonitride, and/or the like.

The weight percentage of the silicon compound within the silicon slurry may be any suitable weight percentage for the desired application. In various embodiments, the silicon slurry may comprise from 10% to 80% by weight silicon compound, from 20% to 70% by weight silicon compound, from 30% to 60% by weight silicon compound, from 40% to 60% by weight silicon compound, about 45% by weight boron compound, and/or about 55% by weight silicon compound. As used in this context only, the term "about" means plus or minus 5 weight percent. The remaining weight percent of the silicon slurry other than the silicon compound may comprise the carrier fluid and/or any other suitable additives.

Further, step 240 may comprise spraying or brushing the silicon slurry onto an outer surface of the boron layer. Embodiments in which the carrier fluid for the silicon slurry is water causes the aqueous silicon slurry to be more suitable for spraying or brushing application processes. In various embodiments, the application of the silicon slurry to the composite structure may not comprise CVD, thus saving the significant monetary expense associated with CVD. Any suitable manner of applying the silicon slurry to the composite structure is within the scope of the present disclosure, except in various embodiments, CVD.

In various embodiments in which the silicon compound comprises particles, the particle size may be between 100 nanometers (nm) and 100 micrometers (μm) (between $3.9 \times 10^{-6}$ inch and 0.0039 inch), between 500 nm and 100 μm (between $2 \times 10^{-5}$ inch and 0.0039 inch), between 500 nm and 50 μm (between $2 \times 10^{-5}$ inch and 0.002 inch), between 1 μm and 50 μm (between $3.9 \times 10^{-5}$ inch and 0.002 inch), between 20 μm and 50 μm (between 0.0008 inch and 0.002 inch), and/or between 30 μm and 40 μm (between 0.001 inch and 0.0016 inch).

In various embodiments, method 400 may further comprise a step 250 of heating the composite structure to form a silicon layer on the composite structure. The silicon layer may be disposed adjacent to, or in direct contact with, the boron layer, such that the boron layer is between the composite structure and the silicon layer. The heating of the composite structure may remove the carrier fluid from the silicon slurry to form the silicon layer. The composite structure may be heated (e.g., dried or baked) at a temperature in the range from about 50° C. (122° F.) to about 200° C. (292° F.). In various embodiments, the composite structure may be heated at a greater temperature (e.g., up to 1000° C. (1832° F.)) to form the silicon layer on the composite structure. Step 250 may, for example, comprise heating the composite structure for a period between about five minutes to about 0.5 hour, or between about 0.5 hour and about 8 hours, wherein the term "about" in this context only means plus or minus ten percent of the associated value. The silicon layer may also be referred to as a coating.

In various embodiments, the silicon layer may comprise a thickness (i.e., the height of the silicon layer extending from the composite structure) of between 20 μm and 200 μm (between 0.0008 inch and 0.008 inch), between 50 μm and 150 μm (between 0.002 inch and 0.006 inch), between 80 μm and 120 μm (between 0.003 inch and 0.005 inch), and/or about 100 μm (0.004 inch), wherein "about" in this context only means plus or minus 15 μm.

In various embodiments, the silicon layer may comprise from 1 to 10 milligrams (mg) of the silicon compound (from $2.2 \times 10^{-6}$ to $2.2 \times 10^{-5}$ pound) per square centimeter ($cm^2$), from 1 to 8 mg of the silicon compound (from $2.2 \times 10^{-6}$ to $1.8 \times 10^{-5}$ pound) per $cm^2$, from 1 to 7 mg of the silicon compound (from $2.2 \times 10^{-6}$ to $1.5 \times 10^{-5}$ pound) per $cm^2$, and/or from 1 to 6 mg of the silicon compound (from $2.2 \times 10^{-6}$ to $1.3 \times 10^{-5}$ pound) per $cm^2$.

In various embodiments, a sealing slurry may be applied to the silicon layer (step 260). The sealing slurry may be in direct contact with the silicon layer. The sealing slurry may comprise a monoaluminum phosphate solution and a carrier fluid (e.g., water). The monoaluminum phosphate solution may comprise any suitable make-up. In various embodiments, the monoaluminum phosphate solution may comprise about 50% by weight monoaluminum phosphate, and about 50% by weight carrier fluid (e.g., water), wherein "about" as used in this context means plus or minus 40% by weight. Applying the sealing slurry may comprise, for example, spraying or brushing the sealing slurry to the silicon layer. Any suitable manner of applying the boron slurry to the composite structure is within the scope of the present disclosure. In various embodiments, the sealing slurry may further comprise phosphoric acid. In such embodiments, the sealing slurry may comprise about 10% to 30% by weight phosphoric acid, about 20% to 30% by weight phosphoric acid, about 20% by weight phosphoric acid, and/or about 25% by weight phosphoric acid ("about" used in this context means plus or minus 5% weight). In various embodiments, the sealing slurry may further comprise water and/or a surfactant. In such embodiments, the sealing slurry may comprise about 10% to 20% by weight water, about 15% to 20% by weight water, or about 19% by weight water ("about" used in this context means plus or minus 3% weight), and about 1% by weight surfactant ("about" used in this context means plus or minus 0.5% weight). The surfactant may comprise, for example, a silicon-based surfactant.

In various embodiments, the sealing slurry may be a phosphate glass sealing slurry comprising a pre-slurry composition, which may comprise a phosphate glass composition in glass frit or powder form, with a carrier fluid (such as, for example, water). The phosphate glass composition may be in the form of a glass frit, powder, or other suitable pulverized form. In various embodiments, the pre-slurry composition may further comprise ammonium dihydrogen phosphate (ADHP) and/or aluminum orthophosphate.

The phosphate glass composition may comprise and/or be combined with one or more alkali metal glass modifiers, one or more glass network modifiers and/or one or more additional glass formers. In various embodiments, boron oxide or a precursor may optionally be combined with the $P_2O_5$ mixture to form a borophosphate glass, which has improved self-healing properties at the operating temperatures typically seen in aircraft braking assemblies. In various embodiments, the phosphate glass and/or borophosphate glass may be characterized by the absence of an oxide of silicon. Further, the ratio of $P_2O_5$ to metal oxide in the fused glass may be in the range from about 0.25 to about 5 by weight.

The phosphate glass composition may be prepared by combining the above ingredients and heating them to a fusion temperature. In various embodiments, depending on the particular combination of elements, the fusion temperature may be in the range from about 700° C. (1292° F.) to about 1500° C. (2732° F.). The resultant melt may then be cooled and pulverized and/or ground to form a glass frit or powder. In various embodiments, the phosphate glass composition may be annealed to a rigid, friable state prior to being pulverized. Glass transition temperature ($T_g$), glass softening temperature ($T_s$) and glass melting temperature ($T_m$) may be increased by increasing refinement time and/or temperature. Before fusion, the phosphate glass composition comprises from about 20 mol % to about 80 mol % of $P_2O_5$. In various embodiments, the phosphate glass composition comprises from about 30 mol % to about 70 mol % $P_2O_5$, or precursor thereof. In various embodiments, the phosphate glass composition comprises from about 40 to about 60 mol % of $P_2O_5$. In this context, the term "about" means plus or minus 5 mol %.

The phosphate glass composition may comprise, or be combined with, from about 5 mol % to about 50 mol % of the alkali metal oxide. In various embodiments, the phosphate glass composition may comprise, or be combined with, from about 10 mol % to about 40 mol % of the alkali metal oxide. Further, the phosphate glass composition may comprise, or be combined with, from about 15 to about 30 mol % of the alkali metal oxide or one or more precursors thereof. In various embodiments, the phosphate glass composition may comprise, or be combined with, from about 0.5 mol % to about 50 mol % of one or more of the above-indicated glass formers. The phosphate glass composition may comprise, or be combined with, about 5 to about 20 mol % of one or more of the above-indicated glass formers. As used herein, mol % is defined as the number of moles of a constituent per the total moles of the solution.

In various embodiments, the phosphate glass composition may be represented by the formula:

$$a(A^1{}_2O)_x(P_2O_5)_{y1}b(G_fO)_{y2}c(A''O)_z \qquad [1]$$

In Formula 1, A' is selected from: lithium, sodium, potassium, rubidium, cesium, and mixtures thereof; $G_f$ is selected from: boron, silicon, sulfur, germanium, arsenic, antimony, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; $y_1$ is a number in the range from about 0.100 to about 0.950; $y_2$ is a number in the range from 0 to about 0.20; and z is a number in the range from about 0.01 to about 0.5; $(x+y_1+y_2+z)=1$; and $x<(y_1+y_2)$. The phosphate glass composition may be formulated to balance the reactivity, durability and flow of the resulting glass boron layer for optimal performance. As used in this context, the term "about" means plus or minus ten percent of the respective value.

The phosphate glass sealing slurry may comprise any suitable weight percentage phosphate glass composition. For example, the phosphate glass sealing slurry may comprise between 20% and 50% by weight phosphate glass composition, between 20% and 40% by weight phosphate glass composition, between 20% and 30% by weight phosphate glass composition, and/or between 30% and 40% by weight phosphate glass composition. The pre-slurry composition (and/or the resulting glass sealing layer) may comprise any suitable weight percentage phosphate glass composition. For example, the pre-slurry composition may comprise between 50% and 95% by weight phosphate glass composition, between 60% and 90% by weight phosphate glass composition, and/or between 70% and 80% by weight phosphate glass composition.

In various embodiments, the sealing slurry may be a borosilicate glass sealing slurry comprising a borosilicate glass and a carrier fluid (e.g., water). In various embodiments, the borosilicate glass sealing slurry may comprise from 10% to 60% by weight borosilicate glass, from 20% to 50% by weight borosilicate glass, and/or from about 30% to 40% by weight borosilicate glass. In various embodiments, the borosilicate glass sealing slurry may comprise about 40% by weight borosilicate glass. In various embodiments, the borosilicate glass sealing slurry may comprise about 60% by weight water. In various embodiments, the borosilicate glass sealing slurry may comprise from 40% to 90% by weight water, from 50% to 80% by weight water, and/or from 60% to 70% by weight water. In various embodiments, the borosilicate glass sealing slurry may comprise about 40% by weight borosilicate glass and 60% by weight water. In this context, "about" means plus or minus 5% by weight. In various embodiments, the borosilicate glass comprised in the borosilicate glass sealing slurry may comprise any suitable borosilicate glass and/or any suitable composition. In various embodiments, the borosilicate glass may comprise silicon dioxide ($SiO_2$), boron trioxide ($B_2O_3$), and/or aluminum oxide ($Al_2O_3$).

In various embodiments, step 260 may further comprise heating the composite structure to form a sealing layer from the sealing slurry (including, for example, forming a borosilicate and/or phosphate glass sealing layer from the borosilicate and/or phosphate glass sealing slurry). The composite structure may be heated to 200° C. (292° F.) to about 1000° C. (1832° F.). The composite structure may be heated at a temperature sufficient to adhere the sealing layer to the silicon layer by, for example, drying or baking the carbon-carbon composite structure at a temperature in the range from about 200° C. (392° F.) to about 1000° C. (1832° F.). In various embodiments, the composite structure is heated to a temperature in a range from about 600° C. (1112° F.) to about 1000° C. (1832° F.), or between about 200° C. (392° F.) to about 900° C. (1652° F.), or further, between about 400° C. (752° F.) to about 850° C. (1562° F.), wherein in this context only, the term "about" means plus or minus 10° C. Further, step 260 may, for example, comprise heating the composite structure for a period between about 0.5 hour and 3 hours, between about 0.5 hour and about 8 hours, or for about 2 hours, where the term "about" in this context only means plus or minus 0.25 hours.

In various embodiments, step 260 may comprise heating the composite structure to a first, lower temperature (for example, about 30° C. (86° F.) to about 300° C. (572° F.)) followed by heating at a second, higher temperature (for example, about 300° C. (572° F.) to about 1000° C. (1832° F.)). Further, step 250 may be performed in an inert environment, such as under a blanket of inert or less reactive gas (e.g., nitrogen, argon, other noble gases, and the like).

In various embodiments, the oxidation protection system may comprise one sealing layer comprising monoaluminum phosphate and phosphoric acid, and/or a borosilicate and/or phosphate glass sealing layer. In various embodiments, the oxidation protection system may comprise multiple sealing layers in any suitable layering order atop the silicon layer. For example, forming an oxidation protection system may comprise disposing a sealing layer comprising monoaluminum phosphate and phosphoric acid onto a composite structure (e.g., onto the silicon layer of the oxidation protection system), heating the composite structure to form a first sealing layer as described herein, disposing a second sealing slurry (e.g., a glass sealing slurry) onto the first sealing layer, and heating the composite structure as described herein to form a glass sealing layer. Either sealing layer in the previous example may be disposed first or second onto the silicon layer.

In various embodiments, the oxidation protection system may comprise two sealing layers comprising monoaluminum phosphate and phosphoric acid. Again, following the application of each sealing layer to the composite structure, the composite structure may be heated as described herein to form a sealing layer. As an example, a first sealing slurry comprising about 60% by weight monoaluminum phosphate (plus or minus 10% by weight), about 20% by weight phosphoric acid (plus or minus 5% by weight), about 19% by weight carrier fluid, such as water (plus or minus 5% by weight), and/or about 1% by weight surfactant (plus or minus 0.7% by weight) may be disposed onto the composite structure (e.g., atop and in direct contact with the silicon layer) and heated to form a first sealing layer. Subsequently, a second sealing slurry comprising about 75% by weight monoaluminum phosphate (plus or minus 15% by weight), and about 25% by weight phosphoric acid (plus or minus 7% by weight) may be disposed onto the composite structure and heated to form a second sealing slurry (e.g., atop and in direct contact with the first sealing layer).

With additional reference to FIG. 1, wear surfaces, such as wear surface 33, of brake disks may reach extremely high temperatures during operation (temperatures in excess of 1093° C. (2000° F.)). At such extreme temperatures of wear surfaces, the oxidation protection systems on non-wear surfaces adjacent to the wear surface (e.g., non-wear surface 45 adjacent to wear surface 33) may experience heating. The oxidation protection systems comprising a phosphate glass (e.g., in a sealing layer) disposed on non-wear surface 45 (such as that represented by data set 305 in FIG. 3, discussed herein) may increase temperature to a point at which the viscosity decreases and causes beading and/or migration of the oxidation protection system layers proximate edges 41, 43 away from edges 41, 43 and the adjacent wear surfaces (e.g., wear surface 33). (Edges 41, 43 and wear surface 33, as labeled in FIG. 1A, simply reference exemplary edges and an exemplary wear surface, respectively, on a brake disk, but edges similar to edges 41, 43 and wear surfaces similar to wear surface 33 may be present on any brake disks (e.g., rotors 32, stators 34, pressure plate 36, end plate 38, or the like).). Thus, composite material on non-wear surface 45 proximate edges 41, 43 may be vulnerable to oxidation because of such migration. Additionally, the extreme temperatures during the operation of brake disks may cause cracks within an oxidation protection system, allowing oxygen to reach the material of the composite structure, causing oxidation and material loss.

With the oxidation protection systems and methods disclosed herein comprising a boron layer disposed on a composite structure and a silicon layer disposed on the boron layer (along with, in various embodiments, at least one sealing layer disposed on the silicon layer), the boron compound in the boron layer and the silicon compound in the silicon layer may prevent, or decrease the risk of, the oxidation protection system migrating from edges of non-wear surfaces adjacent to wear surfaces of composite structures, and additionally give the oxidation protection system self-healing properties to mitigate against oxidation caused by cracks in the oxidation protection system layers. Thus, the oxidation systems and methods described herein may prevent, or decrease the risk of, the oxidation protection system losing material resulting from such oxidation.

During operation, at elevated temperatures (e.g., around 1700° F. (927° C.) or 1800° F. (982° C.)), oxygen may diffuse through, or travel through cracks in, the silicon layer and/or sealing layer(s) in the oxidation protection system, and oxidize the boron compound in the boron layer into boron trioxide ($B_2O_3$). In various embodiments, in which the silicon compound in the silicon layer is silica, in response to the boron compound in the boron layer being oxidized into boron trioxide, the silica may react with the boron trioxide to form borosilicate glass. In various embodiments, in which the silicon compound in the silicon layer is a silica former, in response to temperatures elevating to a sufficient level (e.g., around 1700° F. (927° C.) or 1800° F. (982° C.)), the boron compound in the boron layer may be oxidized into boron trioxide, and the silica former may react (e.g., oxidize) to form silica. In response, the silica may react with the boron trioxide to form borosilicate glass.

If the system comprising the oxidation protection system will be operating a relatively lower temperatures (e.g., below 1700° F. (927° C.)), the silicon compound in the silicon layer may comprise silica because a silica former may not oxidize under such conditions to form the silica to react with the boron trioxide. If the system comprising the oxidation protection system will be operating at relatively higher temperatures (e.g., above 1700° F. (927° C.)), the silicon compound in the silicon layer may be a silica former, or a combination of silica and a silica former. In such embodiments, the silica in the silicon layer may react with the boron trioxide formed at relatively lower temperatures to form borosilicate glass, and the silica former in the silicon layer may form silica at elevated temperatures to react with boron trioxide to form borosilicate glass.

The borosilicate glass may be formed in the cracks of the silicon layer and/or sealing layer(s), and/or flow into cracks formed in the silicon layer and/or sealing layer(s). Therefore, the oxidation protection systems described herein have self-healing properties to protect against cracks formed in the layers of the oxidation protection systems, preventing or mitigating against oxygen penetration and the resulting oxidation and loss of material. Additionally, borosilicate glass has a high viscosity (a working point of about 1160° C. (2120° F.), wherein "about" means plus or minus 100° C. (212° F.), and the working point is the point at which a glass is sufficiently soft for the shaping of the glass). Thus, the high temperatures experienced by edges 41, 43 in their proximity to wear surface 33 may cause minimal, if any, migration of the oxidation protection systems described herein.

TABLE 1 illustrates two slurries comprising oxidation protection compositions (e.g., examples of a base slurry comprising a first phosphate glass composition and a phosphate glass sealing slurry, described herein) prepared in accordance with the description of the glass sealing slurry herein. Each numerical value in TABLE 1 is the number of grams of the particular substance added to the slurry.

TABLE 1

|  | Example | |
| --- | --- | --- |
|  | A | B |
| h-Boron nitride powder | 0 | 8.75 |
| Graphene nanoplatelets | 0 | 0.15 |
| H$_2$O | 52.4 | 60 |
| Surfynol 465 surfactant | 0 | 0.2 |
| Ammonium dihydrogen phosphate (ADHP) | 11.33 | 0 |
| Glass frit | 34 | 26.5 |
| Aluminum orthophosphate (o-AlPO$_4$) | 2.27 | 0 |
| Acid Aluminum Phosphate (AALP) 1:2.5 | 0 | 5 |

As illustrated in TABLE 1, oxidation protection system slurries comprising pre-slurry compositions, which comprise phosphate glass composition glass frit and various additives such as h-boron nitride, graphene nanoplatelets, acid aluminum phosphate, aluminum orthophosphate, a surfactant, a flow modifier such as, for example, polyvinyl alcohol, polyacrylate, or similar polymer, ammonium dihydrogen phosphate, and/or ammonium hydroxide, in a carrier fluid (i.e., water) were prepared. Slurry A may be a phosphate glass sealing slurry which will serve as a sealing layer after heating (such as during step 260). Slurry B may be a suitable base slurry comprising a phosphate glass, which is prone to migration from edges 41, 43 proximate to wear surfaces (e.g., wear surface 33) at high operating temperatures (e.g., around or above 1700° F. (927° C.)), and which will serve as a base layer after heating.

TABLE 2

|  | Example | | | |
| --- | --- | --- | --- | --- |
|  | C | D | E | F |
| Monoaluminum Phosphate (MALP) sol'n | 0 | 0 | 60 | 75 |
| Phosphoric Acid | 0 | 0 | 20 | 25 |
| H$_2$O | 60 | 50 | 19 | 0 |
| BYK-346 surfactant | 0 | 0 | 1 | 0 |
| Silicon Carbide | 0 | 50 | 0 | 0 |
| Boron Carbide | 40 | 0 | 0 | 0 |

TABLE 2 illustrates oxidation protection system slurries in accordance with the embodiments discussed herein. Each numerical value in TABLE 2 is the weight percent of the particular substance added to the slurry. Slurry C is an exemplary boron slurry (to form a boron layer C after heating), slurry D is an exemplary silicon slurry (to form a silicon layer D after heating), slurry E is an exemplary first sealing slurry comprising monoaluminum phosphate and phosphoric acid, along with water and a surfactant (to form a first sealing layer E after heating), and slurry F is an exemplary second sealing slurry comprising monoaluminum phosphate and phosphoric acid (to form a second sealing layer D after heating). The MALP solution used was 50% by weight monoaluminum phosphate and 50% by weight water.

Figure 3:
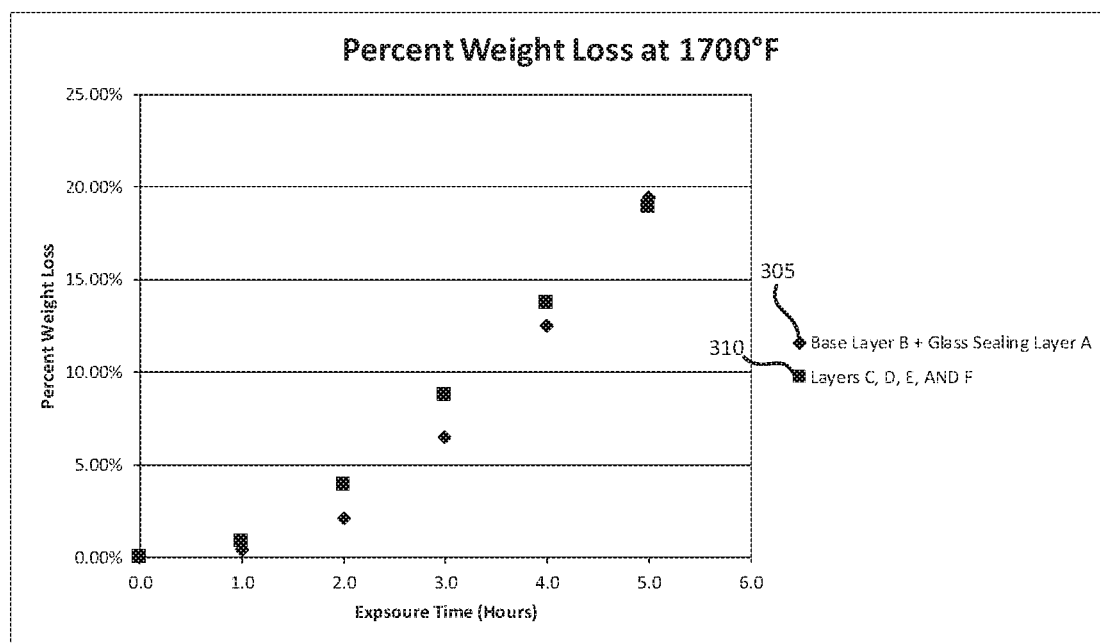
FIG. 3 illustrates experimental data obtained from testing various oxidation protection systems, in accordance with various embodiments.

TABLE 1, TABLE 2, and FIG. 3 may allow evaluation of an oxidation protection system comprising a boron layer, silicon layer, and a sealing layer(s) (substantially free to phosphate glass), represented by data set 310, versus an oxidation protection system comprising a base layer (base layer B) and glass sealing layer (glass sealing layer A) comprising phosphate glass. Percent weight loss is shown on the y axis and exposure time is shown on the x axis of the graph depicted in FIG. 3. For preparing the oxidation protection system comprising base layer B and glass sealing layer A, the performance of which is reflected by data set 305, the base slurry, slurry B, was applied to a 50-gram first carbon-carbon composite structure coupon and cured in inert atmosphere under heat at 899° C. (1650° F.) to form a base layer B. After cooling, the phosphate glass sealing slurry, slurry A, was applied atop the cured base layer B and the coupons were fired again in an inert atmosphere to form a phosphate glass sealing layer A. For preparing the oxidation protection system comprising layers C, D, E, and F, the performance of which is reflected by data set 310, slurry C, comprising 9.3 μm particle size boron carbide, was applied to a 50-gram second carbon-carbon composite structure coupon and dried under heat at 100° C. (212° F.) for about ten minutes to form a boron layer C. After cooling, the silicon slurry, slurry D, was applied atop the boron layer and the coupons were dried again at 100° C. (212° F.) for about ten minutes to form a silicon layer D. Slurry C and slurry D were not applied by CVD. After cooling, the first sealing slurry, slurry E, was applied atop the silicon layer and baked for two hours at 718° C. (1324° F.) to form a first sealing layer E. After cooling, the second sealing slurry, slurry F, was applied atop the first sealing layer E and baked for two hours at 718° C. (1324° F.) to form a second sealing layer F. After cooling, the coupons were subjected to isothermal oxidation testing at 1700° F. (927° C.) over a period of hours while monitoring mass loss.

As can be seen in FIG. 3, the oxidation protection system comprising layers with phosphate glass, reflected by data set 305, resulted in observed exponential increase in material loss over time (hence the hyperbolic shape created by data set 305). Such an increase in material loss over time is presumably due to migration of the oxidation protection system away from edges of a non-wear surface adjacent to a wear surface (e.g., edges 41, 43 in FIG. 1). The oxidation protection system comprising layers C, D, E, and F, reflected by data set 310, resulted in similar material loss over time in a more linear pattern, with the final data point in data set 310 showing less material loss after 5 hours than data set 305. This indicates that the oxidation protection system represented by data set 310 is more effective at preventing material loss at elevated temperatures (e.g., 1700° F. (927° C.) or above) over time than the oxidation protection system represented by data set 305 having a phosphate glass base layer and a phosphate glass sealing layer. As discussed, the oxidation protection system represented by data set 310 may form borosilicate glass in situ at high temperatures, thus filling cracks in the oxidation protection system which otherwise may allow oxygen to penetrate the oxidation protection system and oxidize the material of the underlying composite substrate. Also, the risks of migration of the oxidation protection system reflected by data set 310 away from edges (e.g., edges 41, 43 in FIG. 1) are less than those of the oxidation protection system reflected by data set 305.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming an oxidation protection system on a composite structure, comprising:
    applying a boron slurry to the composite structure, wherein the boron slurry comprises a boron compound and a first carrier fluid, wherein the boron compound comprises boron carbide;
    heating the composite structure to a temperature sufficient to form a boron layer on the composite structure;
    applying a silicon slurry to the composite structure, wherein the silicon slurry comprises a silicon compound and a second carrier fluid;
    heating the composite structure to a temperature sufficient to form a silicon layer on the composite structure;
    applying a first sealing slurry to the silicon layer, wherein the first sealing slurry comprises monoaluminum phosphate solution, phosphoric acid, a third carrier fluid, and a silicon-based surfactant;
    heating the composite structure to a temperature sufficient to form a first sealing layer;
    applying a second sealing slurry to the first sealing layer, wherein the second sealing slurry comprises monoaluminum phosphate solution and phosphoric acid; and
    heating the composite structure to a temperature sufficient to form a second sealing layer,
    wherein the first sealing layer and the second sealing layer are substantially free of phosphate glass.

2. The method of claim 1, wherein the applying the boron slurry, the applying the silicon slurry, the applying the first sealing slurry, and the applying the second sealing slurry each comprise at least one of brushing or spraying.

3. The method of claim 2, wherein the boron compound further comprises at least one of titanium diboride, boron nitride, or zirconium boride.

4. The method of claim 3, wherein the boron layer comprises between one and four milligrams of boron compound per square centimeter.

5. The method of claim 2, wherein the silicon compound comprises at least one of silicon carbide, silicon dioxide, a silicide compound, silicon, fumed silica, or silicon carbonitride.

6. The method of claim 5, wherein the silicon layer comprises between one and six milligrams of silicon compound per square centimeter.

7. The method of claim 3, wherein at least one of the boron compound or the silicon compound comprises particles having a particle size between 100 nanometers and 100 micrometers.

* * * * *